G. C. ANDREWS.
TRACTION ENGINE.
APPLICATION FILED AUG. 21, 1914.
1,238,732.
Patented Sept. 4, 1917.
4 SHEETS—SHEET 1.
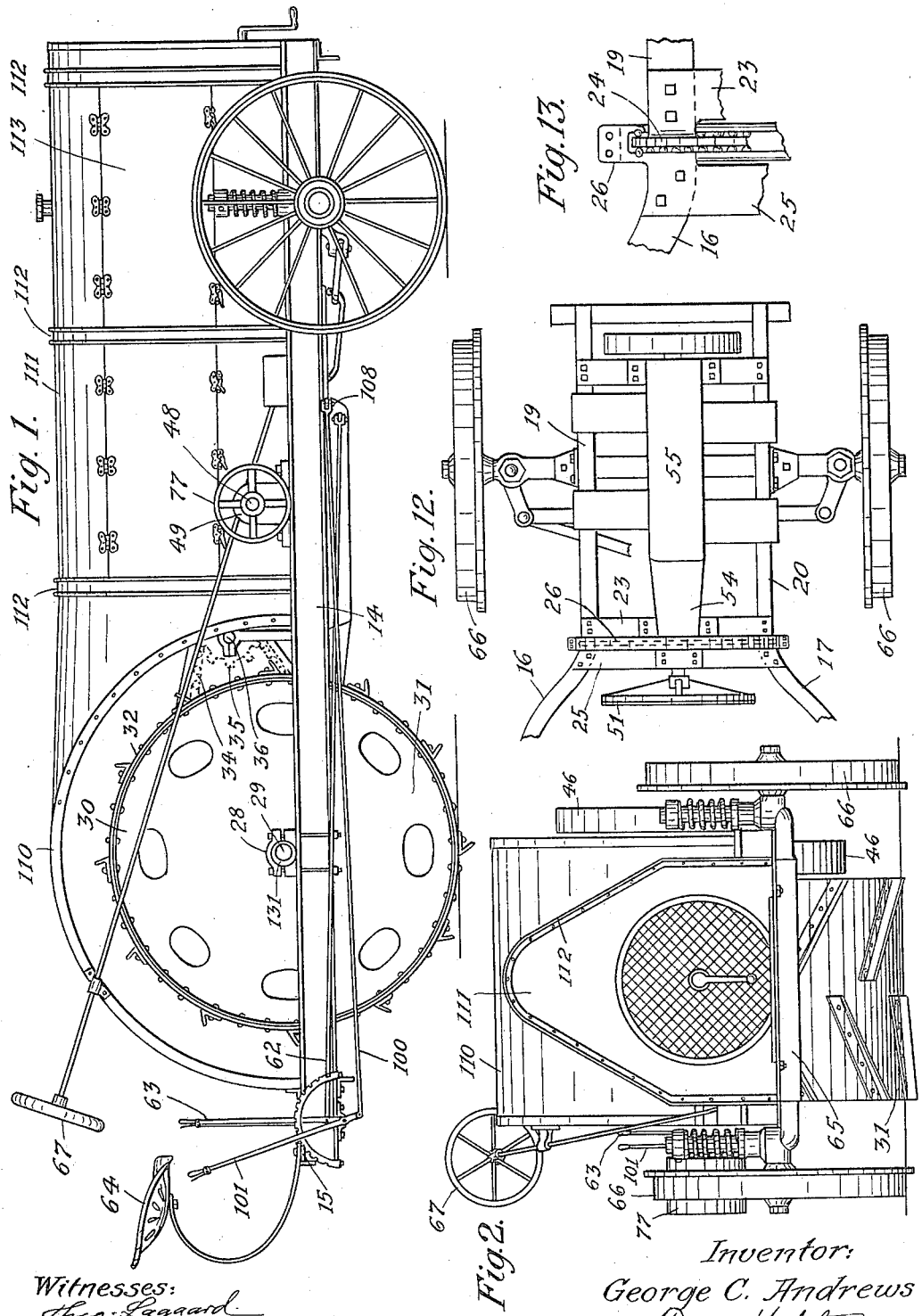
Witnesses:
Theo. Lagaard
H. A. Bowman
Inventor:
George C. Andrews
By P. A. Whiteley
his Attorney.

G. C. ANDREWS.
TRACTION ENGINE.
APPLICATION FILED AUG. 21, 1914.
1,238,732.
Patented Sept. 4, 1917.
4 SHEETS—SHEET 2.
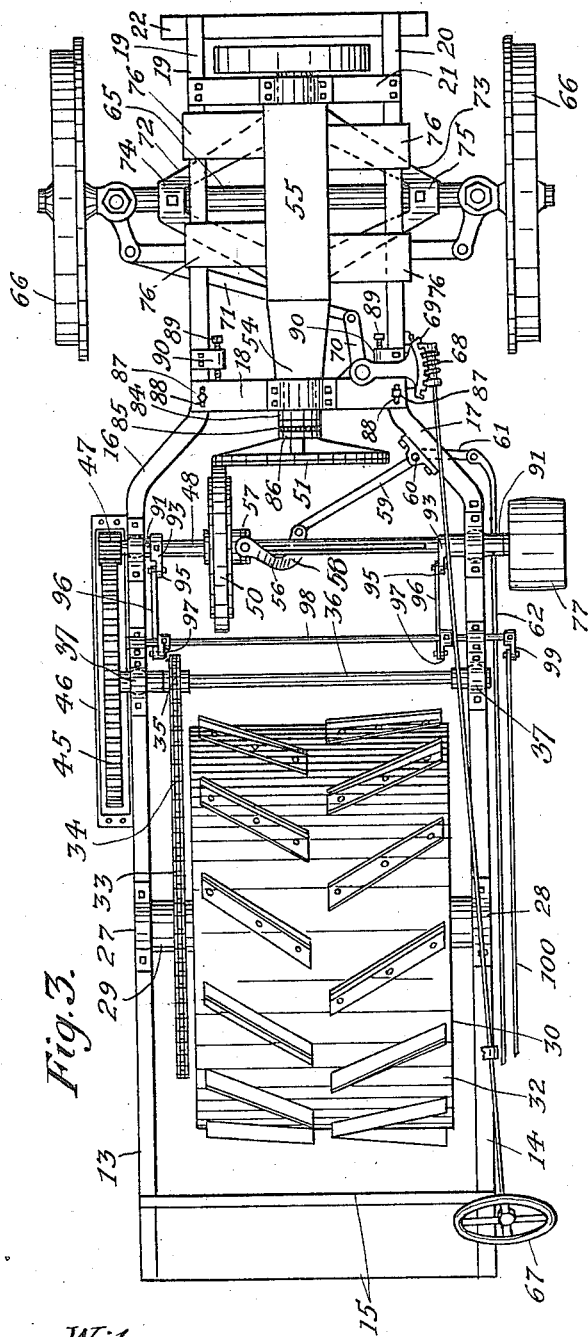
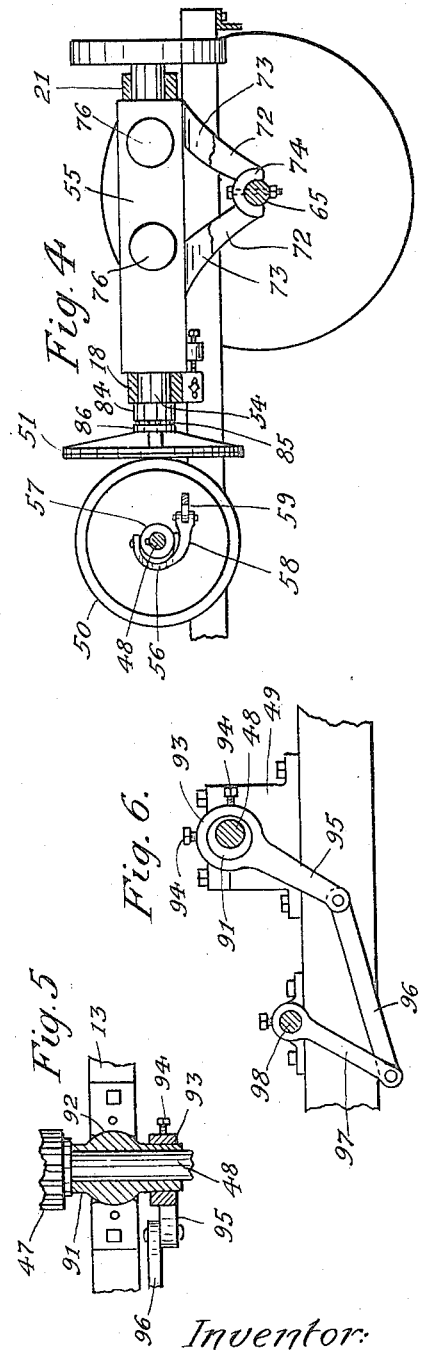
Witnesses:
Theo. Lagaard
H. A. Bowman.
Inventor:
George C. Andrews:
By his Attorney.

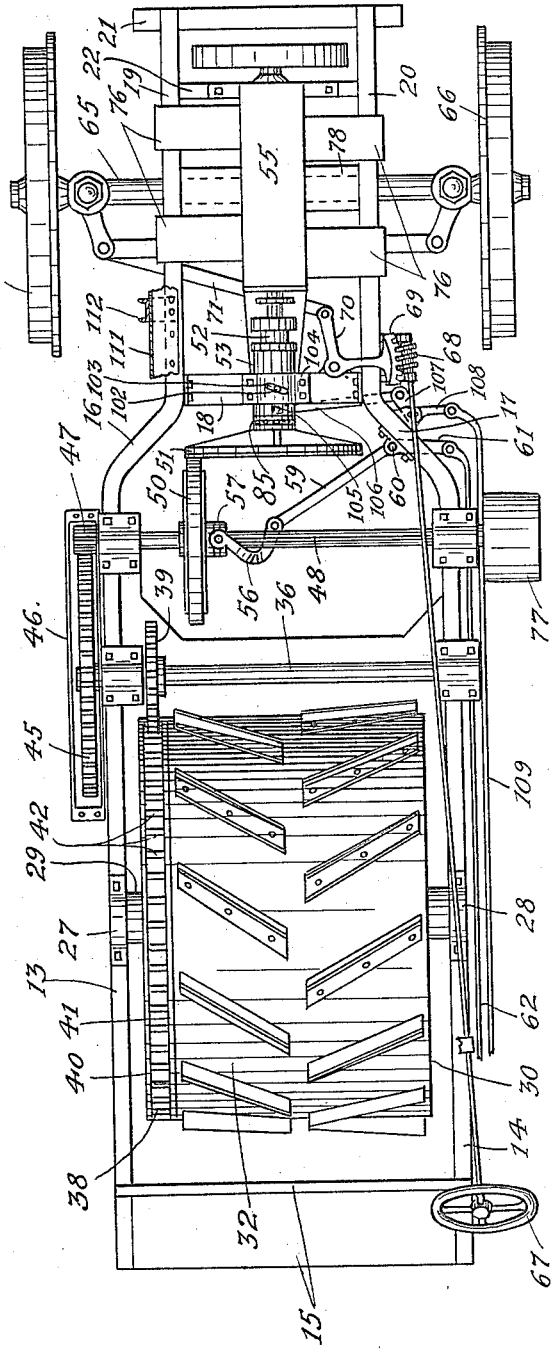

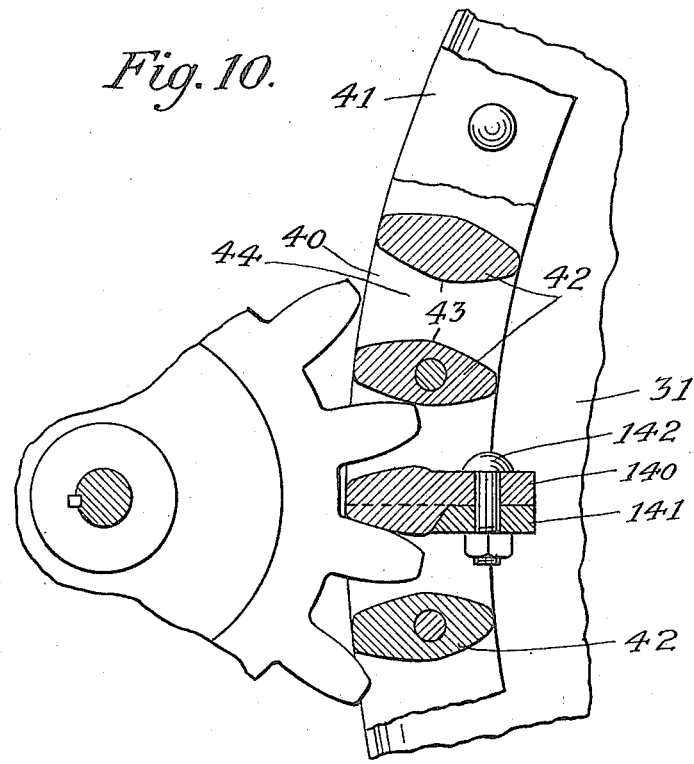
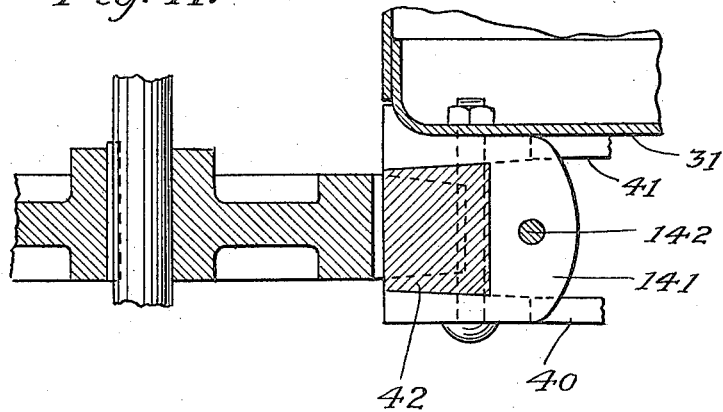

UNITED STATES PATENT OFFICE.

GEORGE C. ANDREWS, OF MINNEAPOLIS, MINNESOTA.

TRACTION-ENGINE.

1,238,732.          Specification of Letters Patent.      Patented Sept. 4, 1917.

Application filed August 21, 1914. Serial No. 857,853.

*To all whom it may concern:*

Be it known that I, GEORGE C. ANDREWS, a citizen of the United States, residing at Minneapolis, in the county of Hennepin and State of Minnesota, have invented certain new and useful Improvements in Traction-Engines, of which the following is a specification.

My invention relates to traction engines to be used in plowing or other farm operations, and has for its object to provide a traction engine for the purpose which shall be extremely compact, strongly supported, light and efficient, and capable of delivering the maximum amount of draft power for the weight and horse power of the engine.

In the construction of my engine I employ a frame comprising in effect two sections, a rear section supported by a single traction wheel and carrying the operator's seat and the transmission mechanism, and a front frame section supported by a pair of front steering wheels and carrying the engine. The axle of the front steering wheels is so supported in reference to the frame and the engine thereon as to oscillate about an axial center which is in alinement, or substantially in alinement, with the crank-shaft of the engine. The various elements of the traction engine are so arranged in reference to the frame, the traction wheel and the steering wheels as to effect a practically symmetrical construction with reference to a longitudinal central line passing through the axis of the engine and a diametrical central line of the traction wheel. This makes a low compact engine which, with the broad traction wheel and well supported steering wheels is capable of traveling over extremely rough ground without liability of upsetting, twisting or distorting any of the movable parts of the engine. When properly incased, an extremely attractive design results. All the parts of the engine are easily accessible by one standing upon the ground.

It is also an object of my invention to provide a friction drive of peculiarly simple and efficient construction. The simplicity and high efficiency of this friction drive is largely due to the combination of the features thereof with the above indicated arrangement of the frame and the parts supported thereby. Improved means for applying and releasing the friction pressure, and for transmitting the power to the traction wheel are also provided.

The full objects and advantages of my invention will appear in connection with the detailed description thereof and are particularly pointed out in the claims.

In the drawings, illustrating the application of my invention in one form,—

Figure 1 is a side elevation of the invention with portions of the casing removed and broken away. Fig. 2 is a front elevation of my traction engine. Fig. 3 is a plan view of the traction engine showing one form of front suspension and pressure-applying means. Fig. 4 shows a longitudinal sectional view of a portion of the traction engine including the motor. Figs. 5 and 6 show detail views of the means of mounting the drive shaft for applying pressure from the friction wheel upon the friction disk. Fig. 7 is a plan view of a modified means of supporting the front frame section and motor from the axle, and of a modified means of applying pressure between friction wheel and friction disks. Figs. 8 and 9 are sectional detail views of the supporting means for the front frame. Figs. 10 and 11 are sectional detail views of the driving gear shown in Fig. 7. Fig. 12 is a modified view of the means of connecting the front and rear frame sections for relative movement of the one in respect to the other. Fig. 13 is a detail of same.

My traction engine comprises a rear frame portion having longitudinal side members 13 and 14, preferably formed of channel iron and rigidly secured together at their rear ends by transverse beams 15, which may also serve as an operator's platform. The front portions of beams 13 and 14 are curved inwardly, as indicated at 16 and 17, and at their nearest approach to one another are connected by transverse frame member 18, which, in the forms shown in Figs. 3 and 7, is also an integral part of the front frame section. As illustrated in these figures, the front frame section comprises longitudinal members 19 and 20, which may, if desired, be integral continuations of the members 13 and 14, front crossbars 21 and 22 rigidly connecting members 19 and 20.

As above stated, in the forms shown in

Figs. 3 and 7 the crossbar 18 is common to the rear frame section and to the front frame section. In the form shown in Fig. 11, a crossbar 23 is applied only to the rear frame section and comprises a fifth wheel clamping flange 24. A separate crossbar 25 is applied to the front frame section and has integrally connected therewith a fifth wheel section 26, said sections being held clamped together with intermediate ball bearings, as indicated. The relations of the respective front and rear sections will hereinafter be more fully pointed out.

Journaled in bearings 27 and 28, upon rear frame members 13 and 14, is an axle 29 upon which is secured a traction wheel 30. This wheel will be relatively of moderate diameter and large width, practically filling the space between the longitudinal members 13 and 14. The wheel, as shown, comprises end disks 31 secured to a hub turning on axle 29 and to a wheel rim 32. The disks 31 may either be cast or made of sheet metal, and are directly riveted to the wheel rim 32. As shown in Fig. 3, a sprocket wheel 33 of less diameter than that of rim 32 is secured directly to one of the disk plates 31 and is operated by a sprocket chain 34 from a sprocket wheel 35 on a shaft 36 journaled upon standards 37 supported by frame members 13 and 14. In the form shown in Fig. 7, a ring gear 38 of special construction, as illustrated in detail in Figs. 10 and 11, is directly bolted to the end disk 31 and is operated by a spur gear or pinion 39 on shaft 36. The gear 39 is preferably sectional and comprises circularly-shaped side bars 40, 41 between which extend the teeth 42. As shown in Fig. 10, these teeth are beveled toward one another in the usual manner to a point indicated at 43, after which they are reversely beveled to the outside of rims 40, 41 so as to leave openings 44 extending entirely through the gear, thus making the gear self-cleaning. These gear members are sectional and provided with engaging end flanges 140, 141 which are secured together by bolts 142, as indicated in Figs. 10 and 11.

Preferably, I provide in bearings 27 and 28 a bushing 131 within which the shaft 29 is eccentrically mounted, as clearly shown in Fig. 1. By means of this eccentric bearing wear of the shaft 29, tending to get the traction wheel 30 out of position, may be readily taken up and said traction wheel adjusted so as to be accurately positioned whenever need may arise.

The shaft 36 has fast thereon a spur gear 45 just outside of frame member 13, preferably housed in a special casing 46. Spur gear 45 is driven by a pinion 47 on a drive shaft 48 journaled in standards 49 supported on frame members 13 and 14. The drive shaft 48 has thereon a friction wheel 50, which, by means later described, is caused to engage a friction disk 51 carried by a sleeve 52 journaled in another sleeve 53, which, in turn is journaled in a bearing member 18, as shown in Fig. 7, or in cross-bars 23 and 25 in the form shown in Fig. 11. As shown in Fig. 3, a part 54, corresponding to sleeve 53, is integral with the crank casing 55 of the motor. The friction wheel 50 is splined upon shaft 48 and is adapted to be moved along the same by means of a clutch fork 56 engaging a collar 57 on the hub of the friction wheel 50. The clutch fork 56 is connected, by means of an extension 58 passing below shaft 48, with an arm 59 pivoted at 61 to the frame portion 17. The arm 59 is integral with another arm 61 pivotally connected by a link 62 with a hand lever 63 adjacent the operator's seat 64 at the rear of the engine. By means of lever 63 the friction wheel 50 may be slid along shaft 48 over the surface of friction disk 51 to vary the speed from the maximum speed, when the friction wheel engages the outer portions of the disk, to neutral, at the center of the disk. The reverse is effected by carrying the friction disk past the center on the other side, and the same variations of speeds is possible in the case of the reverse as in the direct drive.

A preferred form of mounting the front frame section and engine upon the front axle is best shown in Fig. 3. The front axle 65 has pivotally connected therewith stub axles carrying front wheels 66 which are operated by a hand wheel 67 having a worm 68 on the shaft thereof, which worm meshes with a segment 69 by which an arm 70 and link 71, connected with the stub axles, is moved to oscillate the steering wheels for steering the engines. The motor employed is of the opposed-cylinder type and, as shown in Fig. 2, the central crank casing is directly supported from the axle 65 by means of two pairs of arms 72 and 73, respectively, extending to hubs 74 and 75, which are bolted to axle 65 as best shown in Fig. 4. The cylinders 76 of the motor extend in opposite directions from the central crank case 55. The crank-shaft of the engine extends through bearings or sleeves journaled in transverse members 18 and 21 midway between side frame members 19, 20. The crank-shaft thus extends along the longitudinal center of the entire frame construction, and the axis of the crank-shaft will fall substantially in a plane which will include the axis of the traction wheel 30. The front frame, comprised of members 19, 20 and connecting parts, is therefore supported upon the engine crank-shaft through the supports 72 and 73 connected with the crank case and with the axle 65. It is possible, therefore, for the axle 65 and the engine and crank case carried thereby to oscillate in a vertical plane relative to the front frame section. The broad traction wheel 31, therefore, may follow the contour of the ground so as to tip from one side to the other, carrying freely with it the frame and parts supported thereby, both front and rear sections. Since the rear wheel will in general oscillate in its travel over the ground laterally to one side or the other of the vertical plane passing through the center of the wheel and perpendicular to its axle, which plane falls in the axial center of the crank-shaft support of the front frame section, it follows that the traction engine frame virtually oscillates about a central line extending from the front to the rear of the frame and has in effect a two-point support from the ground. This renders the frame support extremely flexible and avoids the tendency to twist and distort the frame which is characteristic of the rigid and unyielding three or four-point support therefor which is found in other traction engines. It is also to be noted that the weight of the traction engine is symmetrically disposed along the line of this center of oscillation, and the center of gravity at any point along the frame normally will be substantially in the vertical plane passing through said central line. The heaviest weights, namely, the motor and the traction wheel are directly disposed about this central line and all of the other elements of the engine have a symmetrical disposition at either side of the vertical plane passing through the central line. For instance, the weight of the drive gearing 39, 45, 47 and housing for the same at the left-hand side of the machine is offset by the weight of belt pulley 77 and the rods, levers, etc., for operating the power-shifting devices and steering mechanism at the right-hand side of the machine. This perfect balance of weights with respect to the vertical plane of support is peculiarly effective in securing flexibility of operation of the machine under various and difficult conditions, and prevents distortion of the frame with the consequent serious result of displacement of parts so the bearings get out of line, and racking of the machine to pieces follows.

Another method of securing the front frame section to the axle 65 is shown in Figs. 7, 8 and 9. Here a crossbar or bolster 78 is rigidly secured to the bottom of beams 19 and 20. The member 78 has flanges 79 and 80 which straddle a piece 81 rigidly bolted upon axle 65. A bolt 82 extending transversely through flanges 79, 80 and a raised portion 83 of piece 81 connects the frame and axle for relative oscillatory movements in a vertical plane. This form of connection has some of the advantages of the preferred form first described, but differs broadly in this particular, that the frame and motor are rigidly connected so that any differential twist or movement of the frame may be communicated to the motor casing so as possibly to interfere with the proper action of the same.

As above pointed out, the preferred form of the invention, as illustrated in Figs. 3 to 6, has the bearing portion 54 integrally connected with the crank case 55 and extended through the crossbar 18. A washer 84 is positioned between crossbar 18 and a series of ball bearings 85 which are positioned between the washer 84 and the hub 86 of friction disk 51. The crossbar 18 in this form is adjustably secured upon members 19 and 20 by means of bolts 87 extending through slots 88 in said crossbar, set bolts 89 threaded through brackets 90 serving to hold the crossbar 18 against forward pressure exerted upon it through washer 84 from the friction wheel 50 engaging friction disk 51. By this means, any slight wear on the surface of friction disk 51, due to continued use, may be compensated by adjustment of bar 18.

As shown in Figs. 3, 5 and 6, the forcible engagement of friction wheel 50 with disk 51 is effected by the following means. The shaft 48 extends through apertures eccentrically positioned in bearing blocks 91 which are mounted, preferably, with ball-shaped bearing portions 92 in the standards 49. Secured by collars 93 and set bolts 94 to bearing blocks 91 are arms 95, which are connected by links 96 with arms 97 fast on a rock shaft 98 journaled upon frame members 13 and 14. The rock shaft 98 at one end extends outside of frame member 14, where it is supplied with an arm 99 which connects through a link 100 with a lever 101 near the seat 64 of the operator. It will be obvious that by manipulating lever 101 so as to oscillate shaft 98 the bearings 91 will be turned, which, owing to the eccentric position of shaft 48 in said bearings, will cause the shaft to move bodily along frame members 13 and 14, thus forcing the friction wheel 50 against friction disk 51 with any desired pressure, or withdrawing said friction wheel from engagement with the friction disk. As shown in Fig. 7, the shaft 48 is journaled in fixed bearings and the bearing sleeve 53 is held by crossbar 18 and adapted to be moved longitudinally therein so as to move the friction disk 51 and cause that to engage the friction wheel 50. Ball bearings 85 are provided between the hub of disk 51 and the end of sleeve 53. The sleeve 53 has thereon studs 102 extending through slots 103 in the bearing 104 on crossbar 18. An arm 105 is fast on sleeve 53 and is connected by a link 106 with an arm 107 pivoted upon the frame portion 17 and integral with an arm 108 which is actuated through link 109 from lever 101. When the sleeve 53 is turned, the studs 102 thereon engaging the walls of oblique slots 103 will move the sleeve bodily lengthwise, and with it the friction disk 51, to force the same against friction wheel 50 with the desired pressure or disconnect engagement of the friction disk and friction wheel.

As illustrated in Figs. 1 and 2, a casing or guard 110 is arched over the traction wheel 30 and runs into a casing 111 which covers the engine and transmission mechanism, said casing 111 being supported by arched channels 112 and provided with hinged doors 113 by which ready access to the interior may be had.

The manner of operation of my traction engine has been fully given in connection with the detailed description thereof. It will be apparent that an exceedingly symmetrical, compact and effective arrangement of the various parts is provided. The machine is low and all parts thereof can be reached with the utmost ease by a man standing upon the ground. The balance of weights, as has been pointed out, is such that in the preferred form at least the frame and parts carried thereby is given in effect a two-point support along the central vertical plane of the machine with the weights of the parts symmetrically disposed upon either side of this plane. The driving mechanism and control is such as to reduce the number of parts to a minimum. The ball bearing arrangement of shafts, illustrated in Fig. 5, may be carried out in respect to all of the transverse shafts mounted upon the frame, which will effectively prevent any racking of the bearings or the getting of the parts out of alinement.

I claim:

1. A traction engine comprising a rear frame section formed of interconnected parallel side bars, a single traction wheel having its axle journaled upon said bars and disposed between the same for supporting and driving the rear frame, a front frame section comprising interconnected parallel side members, said front section being of less width than the rear section and connected therewith, a front axle having steering wheels connected therewith directly supporting the front frame, an explosive engine supported upon the front frame with the axis of its crank shaft disposed along the center line of the traction engine, and driving connections from said engine to the traction wheel mounted upon the rear frame.

2. A traction engine comprising a rear frame section formed of interconnected parallel side bars, a single traction wheel having its axle journaled upon said bars and disposed between the same for supporting and driving the rear frame, a front frame section comprising interconnected parallel side members, said front section being of less width than the rear section and connected therewith in the plane thereof, a front axle having steering wheels connected therewith directly supporting the front frame, an opposed cylinder explosive engine supported upon the front frame with the axis of its crank shaft disposed along the center line of the traction engine, and driving connections from said engine to the traction wheel mounted upon the rear frame.

3. A traction engine comprising a rear frame section formed of interconnected parallel side bars, a single traction wheel having its axle journaled upon said bars and disposed between the same for supporting and driving the rear frame, a front frame section comprising interconnected side members, said front section being of less width than the rear section and connected therewith, a front axle having steering wheels connected therewith, means supporting said front frame upon the front axle for relative oscillation of said axle and frame in a vertical plane, an opposed cylinder explosive engine supported upon the front frame with the axis of its crank shaft disposed along the center line of the traction engine, a friction disk upon said crank shaft adjacent the point of junction of said front and rear frame sections, a drive shaft and connections therefrom on the rear frame section for operating the traction wheel, and a friction wheel on the drive shaft coöperating with the friction disk.

4. A traction engine comprising a rear frame section formed of interconnected parallel side bars, a single traction wheel having its axle journaled upon said bars and disposed between the same for supporting and driving the rear frame, a front frame section comprising interconnected side members, said front section being of less width than the rear section and connected therewith, a front axle having steering wheels connected therewith, means supporting said front frame upon the front axle for relative oscillation of said axle and frame in a vertical plane, an opposed cylinder explosive engine supported upon the front frame with the axis of its crank shaft disposed along the center line of the traction engine, a friction disk upon said crank shaft adjacent the point of junction of said front and rear frame sections, a drive shaft and connections therefrom on the rear frame section for operating the traction wheel, a friction wheel on the drive shaft coöperating with the friction disk, and means for moving the drive shaft bodily along the rear frame members to force the friction wheel against the friction disk.

5. A traction engine comprising a frame formed of interconnected parallel side bars, a single traction wheel having its axle journaled upon said bars and disposed between the same for supporting the rear of the frame and driving the same, an explosive engine supported upon the front of the frame with the axis of its crank shaft disposed along the center line of the traction engine, a friction disk upon said crank shaft midway between said frame bars, a drive shaft and connections therefrom supported on said frame bars for operating the traction wheel, a friction wheel on the drive shaft coöperating with the friction disk, and means for moving the drive shaft bodily along the rear frame members to force the friction wheel against the friction disk.

6. A traction engine comprising a frame formed of interconnected parallel side bars, a single traction wheel having its axle journaled upon said bars and disposed between the same for supporting the rear of the frame and driving the same, an explosive engine supported upon the front of the frame with the axis of its crank shaft disposed along the center line of the traction engine, a friction disk upon said crank shaft, a drive shaft and connections therefrom for operating the traction wheel, a friction wheel on the drive shaft coöperating with the friction disk, and means for moving the drive shaft and friction disk relatively to force the friction wheel against the friction disk.

7. A traction engine comprising a frame formed of interconnected parallel side bars, a single traction wheel having its axle journaled upon said bars and disposed between the same for supporting the rear of the frame and driving the same, an explosive engine supported upon the front of the frame with the axis of its crank shaft disposed along the center line of the traction engine, a friction disk upon said crank shaft midway between said frame bars, a drive shaft and connections therefrom supported on said frame bars for operating the traction wheel, a pair of eccentric bearings in which said drive shaft is mounted, a friction wheel on the drive shaft coöperating with the friction disk, and means for oscillating the eccentric bearings to move the drive shaft bodily along the frame members to force the friction wheel against the friction disk.

In testimony whereof I affix my signature in presence of two witnesses.

GEORGE C. ANDREWS.

Witnesses:
F. A. WHITELEY,
H. A. BOWMAN.

Copies of this patent may be obtained for five cents each, by addressing the "Commissioner of Patents, Washington, D. C."